Patented Dec. 5, 1950

2,533,027

UNITED STATES PATENT OFFICE 2,533,027

METHOD OF FORMING POROUS NODULES

Ernest J. Maust and Clinton A. Hollingsworth, Lakeland, Fla., assignors to Coronet Phosphate Company, New York, N. Y., a corporation of New York No Drawing. Application April 26, 1946, Serial No. 665,348

4 Claims (Cl. 71—44)

This invention relates to porous nodules, pellets, briquets and the like, and has for its object the provision of certain improvements for imparting a desired, and usually high, degree of porosity to nodules etc. in order to promote their subsequent treatment by gaseous reaction agents and the like.

In the treatment of a finely divided material by a gaseous reaction agent it is frequently advantageous to nodulize the material. In order to insure complete penetration of the gaseous agent throughout the mass of the nodules, they should be relatively small, say from $\frac{1}{16}$ to 1 inch in diameter in the case of generally round nodules, and porous. A typical instance where such nodulizing is especially advantageous is in the defluorination of phosphate rock by water vapor, and emphasis is herein given to the application of the invention to that operation merely for purposes of explanation and illustration.

Fluorine is present in practically all native phosphate rock, in amount varying in the different areas in which it occurs. The common Florida phosphate rock (e. g. pebble rock) usually contains from 3.5 to 4% of fluorine, around 75% bone phosphate of lime (B. P. L.), around 5% silica, around 5% calcium carbonate, around 2% iron and aluminum oxides, and the balance organic matter and other impurities. The fluorine is commonly believed to be present as calcium fluoride and also combined with the tri-calcium phosphate as calcium fluorphosphate or fluorapatite ($Ca_{10}F_2(PO_4)_6$), and this combination is believed to be largely responsible for the low fertilizer efficiency of the raw rock (or concentrate), as evidenced by the customary ammonium citrate solubility test. Moreover, the high fluorine content of the raw rock makes it unsuitable as an animal feed or mineral supplement. Among the many proposals for defluorinating raw phosphate rock, the calcination process in the presence of silica and water vapor has heretofore appeared the most promising and a vast amount of work has been done in the endeavor to commercialize that process.

In defluorinating phosphate rock by calcination in the presence of silica and water vapor, it has heretofore been recognized that nodulizing of the finely divided rock is advantageous. The nodulizing may be carried out as a preliminary or preparatory operation or may be effected in situ immediately preceding calcination. For example, suitable nodules, generally round in shape and varying in diameter from $\frac{1}{16}$ to 1 inch, may be made by moistening the finely divided rock with water or other suitable liquid and tumbling at room temperature in a rotating cylinder, barrel or the like. From 12 to 18% by weight of water or the like, and generally around 15%, will sufficiently moisten the dry finely divided rock for producing satisfactory nodules by tumbling. Nodules may also be made by drying an aqueous slurry of the rock, and cutting the dried product into suitably-sized cubes or other shapes. Nodules may also be made mechanically by briquetting or the like, although nodules so produced are generally too dense or compact for effective subsequent penetration of the water vapor. When calcination is carried out in a rotary kiln, nodulizing may conveniently be effected in situ by making a slurry of the finely divided phosphate rock with from 40 to 50% by weight of water, and heating the slurry and evaporating the water in the low temperature end of the rotating kiln.

However made, the nodules should have a high degree of porosity in order that the water vapor may effectively penetrate throughout the entire mass of each individual nodule during calcination. The present invention is based on our discovery that a highly effective porosity can be imparted to the nodules by including carbonaceous material in the nodules and eliminating substantially all of the carbon of the carbonaceous material by reaction with water vapor at an elevated temperature with evolution of the resulting gaseous products. Thus, the invention, in its broad aspect, involves mixing a suitable amount of carbonaceous material with the finely divided material to be subsequently subjected to the action of a gaseous reaction agent, nodulizing the mixture, and heating the nodules in the presence of water vapor to an elevated temperature at which the water vapor reacts with the hot carbon of the carbonaceous material with the evolution of hydrogen and carbon monoxide, in much the same way that water gas is formed. The heat treatment in the presence of water vapor is continued until the nodules are decarbonized for all practical purposes, that is until substantially all of the carbon has been eliminated, leaving the nodules with the desired degree of porosity.

We have found that the contemplated reaction between water vapor and the carbonaceous material takes place at a temperature around 1800° F. but proceeds more energetically at somewhat higher temperatures, so that in practice we prefer to use an elevated temperature in excess of 1800° F. So far as concerns the reaction between the water vapor and carbonaceous material, there is no critical higher temperature, but other practical considerations generally limit the decarbonization temperature to not higher than 2500° F., and preferably not higher than about 2400° F., a temperature of from about 2000° F. to about 2400° F. giving satisfactory results in most cases. Temperatures that cause substantial fusion or sintering of the nodules should be avoided. Such temperatures are those at which the nodules become sticky, and tend to cling or stick to the wall of the decarbonizing apparatus, and, in a rotary kiln, fail to flow freely and easily through the kiln. Such substantial sintering or fusion of the nodules impedes effective penetration of the water vapor throughout the mass of each individual nodule, with the result that all of the carbon is not eliminated. On the other hand, a slight amount of sintering is advantageous since it imparts a desired amount of strength to the decarbonized porous nodules. Thus, in the case of most finely divided phosphate rocks, incipient sintering takes place at about the same temperatures at which the water vapor reacts with the carbonaceous material, and this slight, incipient sintering is sufficient to convert the nodules into relatively hard clinkers. Hence, when porosity is attained by the removal of carbon, the clinkered nodules are sufficiently strong to withstand subsequent handling in the calcining kiln or furnace without disintegration. Temperatures at which carbon reacts with the finely divided material should also be avoided. In the case of phosphate rock, too high a temperature of carbonization may cause a loss of phosphorus, by reduction of the phosphatic material if sufficient water vapor is not present. In this connection, it will be understood that the invention is only applicable where the presence of water vapor at the decarbonization temperature has no deleterious or objectionable effect upon the finely divided material and other constituents of the nodules.

A wide variety of carbonaceous materials are available for the practice of the invention. Among these may be mentioned, by way of example, bituminous or anthracite coal, coke, charcoal, lamp black and other forms of carbon, liquid and solid petroleum products, waste sulphite liquor, flour, distillery slops, sawdust, ground up grape fruit peelings, etc. Solid carbonaceous materials are crushed (when necessary) and finely ground, preferably so that at least 75% passes through a 200 mesh standard Tyler screen, and substantially all passes through a 65 mesh screen. At least 5% by weight of carbonaceous material is required to impart any effective degree of porosity to the nodules, and generally at least 10% is preferred. The higher the percentage of carbonaceous material initially included in the nodules, the higher will be the porosity of the decarbonized nodules. In the case of phosphate rock, especially where the silica content is less than 4%, the nodules may initially contain up to 50% by weight of carbonaceous material, from 20 to 40% by weight usually giving satisfactory results.

The invention is peculiarly applicable to the defluorination of phosphate rock by calcination in the presence of water vapor because the same gaseous reaction agent, viz water vapor, is used in the decarbonizing step of the invention as well as in the subsequent defluorinating step. Thus, the invention can be applied with advantage in the defluorinating procedures disclosed in the Maust Patent No. 2,446,978, patented August 10, 1948, and in the procedures disclosed in our copending patent applications Ser. Nos. 655,344, filed April 26, 1946, now Patent 2,479,389, issued August 16, 1949, 655,345, filed April 26, 1946, now abandoned, and 655,346 filed April 26, 1946, now Patent 2,478,200, issued August 9, 1949.

In carrying out the invention for preparing porous nodules for defluorinating phosphate rock or other phosphatic material containing fluorine, the rock or the like is crushed and finely ground, preferably so that at least 65% passes through a 200 mesh standard Tyler screen and substantially all passes through a 65 mesh screen. The finely divided rock and finely divided carbonaceous material are intimately mixed, and the mixture nodulized in any suitable manner. The mixture may also contain such other additive agents as may be required or desired in the particular process of defluorinating to which the porous nodules are subsequently subjected, such, for example, as silica, aluminum compounds, bentonite etc. The amount of carbonaceous material may be from 5 to 50% by weight based on the weight of the mixture subjected to nodulizing. The nodules are then heated to an elevated temperature, preferably exceeding 1800° F., but usually not higher than 2500° F., in the presence of water vapor, and the destructive reaction of the water vapor upon the carbonaceous material is continued at that temperature until all of the carbon has been eliminated, and the nodules become porous through decarbonization.

The decarbonizing can be effected in any suitable apparatus, such as a rotary kiln, electric furnace, shaft furnace, sintering machine etc. The multiple hearth shaft furnace disclosed in the copending patent application of one of us (Maust) Ser. No. 679,178, filed June 25, 1946, is a particularly suitable apparatus for the practice of the invention. In whatever apparatus employed, intimate and continuous association of the water vapor with the entire body or charge of nodules undergoing decarbonization is necessary. As rapidly as water vapor is consumed in the operation, fresh water vapor must be available to instantly replace that consumed, and free evolution of the resulting gaseous products (mostly hydrogen and carbon monoxide) is necessary. Heating in the presence of water vapor is thus continued until substantially all of the carbon content of the nodules has been eliminated, thereby imparting to the nodules a degree of porosity corresponding to the voids resulting from the elimination of carbon.

The gaseous products of decarbonization may be collected and burned as fuel. In a rotary kiln, a large part of these gaseous products will burn immediately above the charge in the kiln, adequate air for combustion being admitted to the kiln for this purpose, and the resulting supplemental internal heating should be correlated with the usual firing or heating means of the kiln.

The resulting decarbonized and porous nodules may be subjected to defluorination in accordance with any desired process. The nodules may be cooled and stored, awaiting defluorination, or may be directly and without substantial loss of heat subjected to defluorination, as for example in the hot end of the same rotary kiln employed for decarbonization, or on the lower multiple hearths of the aforementioned Maust shaft furnace. Since we have observed, in practicing the invention, that decarbonized nodules which have been cooled appear to fuse at a lower temperature than if not cooled, we prefer to directly subject the decarbonized nodules, without intermediate cooling and preferably without any loss of heat, to defluorination.

The time required for decarbonization depends upon the temperature of heating, decreasing at higher temperatures. Little or no decarbonization takes place with the commonly available carbonaceous materials at temperatures below 1800° F. The effect of temperature on the time of decarbonization is illustrated in the following table. The charge was made up of 59.75% by weight of Russian apatite (low silica content) ground to 78% minus 200 mesh and 39.75% by weight of high grade (ash content less than 10%) bituminous coal ground to 51.5% minus 200 mesh. 0.5% by weight of bentonite was included to impart residual strength to the nodules. The apatite, coal and bentonite were intimately mixed, nodulized (round shapes about ½ inch in diameter), and placed in an electric furnace through which water vapor was continuously passed. The nodulized charge was held in the furnace for the indicated time in the presence of water vapor until no further water gas was evolved, thus determining the time of complete decarbonization. The evolved water gas was ignited outside the furnace, and burned with a blue flame.

| Temperature | Time of Carbonization |
| --- | --- |
| ° F. | Minutes |
| 1,800 | Indefinite. |
| 1,900 | 42 |
| 2,000 | 30 |
| 2,100 | 18 |
| 2,200 | 15 |
| 2,300 | 13.5 |
| 2,400 | 11 |
| 2,500 | 9.5 |
| 2,600 | 9 |

The effect of different amounts of coal on the defluorination of Florida phosphate rock is shown in the following example. The analysis of the phosphate rock was as follows:

|  | Per cent |
| --- | --- |
| Total $P_2O_5$ | 35.10 |
| Insoluble ($SiO_2$) | 4.69 |
| $Fe_2O_3$ and $Al_2O_3$ | 2.50 |
| Fluorine | 3.42 |

Fineness, 70% minus 200 mesh.

The analysis of the bituminous coal was as follows:

|  | Per cent |
| --- | --- |
| Volatile matter | 29.1 |
| Ash | 7.2 |

Fineness, 83.4% minus 200 mesh.

The finely ground phosphate rock and coal (and 0.5% bentonite in each case) were intimately mixed together in different proportions. The mixture was made in the form of a slurry, dried and cut-up into ⅜ inch cubes. The cube nodules were first heated at a decarbonizing temperature increasing from 1800° F. to 2500° F., in an electric furnace through which water vapor under a slight pressure was continuously passed, until all of the carbon was eliminated. The temperature of the furnace was then raised to the defluorinating temperature of 2600° F., and the nodules were held at that temperature in the presence of water vapor under a slight-pressure for the varying indicated time intervals, the residual fluorine content being determined after each of these different periods of heat treatment. The slight water vapor pressure was needed to assure direct penetration of the nodule with water vapor to both remove the coal by destructive reaction with the water vapor and to remove the fluorine by the action of the water vapor.

| Minutes at Calcining Temp. | Percent fluorine after varying times of calcination with— | | | |
| --- | --- | --- | --- | --- |
|  | No coal | 20% coal | 30% coal | 40% coal |
| 3.5 | 1.92 | 1.54 | 1.48 | 1.20 |
| 7 | 1.74 | 1.22 | .90 | .56 |
| 14 | 1.63 | .80 | .34 | .10 |
| 20 | 1.26 | .58 | .06 | .02 |

The improved defluorination with larger amounts of coal initially mixed with the phosphate rock was due to the higher degree of porosity thereby imparted to the decarbonized nodules.

In the following similar example, the same procedure was followed, with the same defluorinating temperature of 2600° F., using the same coal and bentonite in the same percentages, but a Virginia apatite of the following analysis:

|  | Percent |
| --- | --- |
| Total $P_2O_5$ | 40.30 |
| Insoluble ($SiO_2$) | 3.77 |
| $Fe_2O_3$ and $Al_2O_3$ | 1.26 |
| Fluorine | 2.52 |

Fineness, 69.2% minus 200 mesh.

| Minutes at Calcining Temp. | Percent fluorine after varying times of calcination with— | | | |
| --- | --- | --- | --- | --- |
|  | No coal | 20% coal | 30% coal | 40% coal |
| 3.5 |  | 1.42 | 1.22 | 1.04 |
| 7 | 1.58 | .76 | .54 | .32 |
| 14 | 1.00 | .16 | .07 | .06 |
| 20 | .88 | .04 | .02 | .01 |

The defluorinated product must be cooled rapidly to prevent the tricalcium phosphate in the product reverting from its alpha form back to its original insoluble beta form. The alpha form is available as a fertilizer whereas the beta form is not. The defluorinated product is in the form of individual clinkers, and is finely ground and is then ready for marketing and use as a mineral supplement in animal feeds or as a fertilizer.

As hereinbefore mentioned, we prefer to include from 0.5 to 2% by weight of bentonite in the charge mixture prior to nodulizing, in order to impart a desirable degree of strength to the dried nodules to enable them to withstand subsequent handling without dusting or disintegration, and to prevent objectionable dusting of the nodulized charge both during decarbonization and subsequent treatment such as defluorination. When the finely divided material has sufficient natural colloidal content to form a strong nodule upon drying, little and perhaps no bentonite is required. Thus, some phosphate rocks, such for example as Florida pebble rock and the phosphate rocks from North Africa, have sufficient natural colloidal constituents when finely ground to form strong nodules upon drying, and hence require but a small addition (e. g. 0.5%) of bentonite. On the other hand, phosphate rocks of the apatite type have little or no colloidal constituents, and as much as 2% by weight of bentonite may advantageously be included in the charge mixture to impart the desired degree of strength to the dried nodules.

We claim:

1. The method of imparting porosity to nodules of phosphatic materials suitable for subsequent defluorination which comprises nodulizing a mixture of the material and at least 10% by weight of a carbonaceous material from the class consisting of coal and coke, subjecting the resultant nodules to the action of water vapor at a temperature of at least 2000° F., the temperature being sufficiently high to bring about incipient sintering of the particles of phosphatic material which will bond them together and strengthen the nodules as the carbonaceous material is removed, but not so high as to cause fusion of the particles of phosphatic material, the amount of water vapor present during the reaction being sufficient to prevent reduction of phosphatic material by reaction with carbon, and continuing the treatment of the nodules with the water vapor at said temperature until substantially all of the carbon of the carbonaceous material is eliminated by reaction with the water vapor and evolution of the resulting gaseous products, whereby the nodules have a desired degree of porosity and sufficient strength to withstand subsequent calcination without disintegration.

2. The method of claim 1 in which the nodules are subjected to the action of water vapor at a temperature between 2100° F. and 2400° F.

3. The method of claim 1 in which after decarbonization of the nodules, the resultant porous nodules are calcined at a temperature of at least 2500° F. in the presence of water vapor until fluorine contained in them is in large part eliminated.

4. The method of claim 3 in which the decarbonized and porous nodules are subjected to calcination directly after decarbonization and without substantial loss of heat.

ERNEST J. MAUST.
CLINTON A. HOLLINGSWORTH.

REFERENCES CITED

The following references are of record in the file of this patent:

UNITED STATES PATENTS

| Number | Name | Date |
|---|---|---|
| 526,180 | Dubbs | Sept. 18, 1894 |
| 1,032,763 | Newberry et al. | July 16, 1912 |
| 1,396,149 | Soper | Nov. 8, 1921 |
| 1,478,215 | Gieseche | Dec. 18, 1923 |
| 1,842,843 | Rothe et al. | Jan. 26, 1932 |
| 1,902,832 | Caldwell | Mar. 28, 1933 |
| 2,121,776 | Baily | June 28, 1938 |
| 2,189,248 | Luscher | Feb. 6, 1940 |
| 2,279,033 | Dolbear | Apr. 7, 1942 |
| 2,395,231 | McNeil | Feb. 19, 1946 |

FOREIGN PATENTS

| Number | Country | Date |
|---|---|---|
| 13,891 | Great Britain | A. D. 1911 |